United States Patent
Atsuta et al.

(10) Patent No.: US 7,184,914 B2
(45) Date of Patent: Feb. 27, 2007

(54) SENSOR SIGNAL PROCESSOR

(75) Inventors: Akio Atsuta, Kanagawa-ken (JP); Masahiko Igaki, Kanagawa-ken (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 11/457,355

(22) Filed: Jul. 13, 2006

(65) Prior Publication Data

US 2006/0247884 A1    Nov. 2, 2006

Related U.S. Application Data

(63) Continuation of application No. 10/968,320, filed on Oct. 18, 2004, now Pat. No. 7,099,790.

(30) Foreign Application Priority Data

Oct. 22, 2003 (JP) .............................. 2003-361535

(51) Int. Cl.
*G01B 7/14* (2006.01)
*G01R 31/00* (2006.01)

(52) U.S. Cl. ................................. 702/117; 324/207.11

(58) Field of Classification Search ................ 702/117; 324/207.11
See application file for complete search history.

(56) References Cited

U.S. PATENT DOCUMENTS

| 7,129,698 | B2 * | 10/2006 | Herzer ................... 324/207.11 |
| 2005/0052179 | A1 | 3/2005 | Herzer |
| 2005/0072911 | A1 * | 4/2005 | Kuroda et al. ......... 250/231.13 |

FOREIGN PATENT DOCUMENTS

SZ    1092525    11/1967

* cited by examiner

*Primary Examiner*—Michael Nghiem
*Assistant Examiner*—Cindy D. Khuu
(74) *Attorney, Agent, or Firm*—Canon U.S.A. Inc I.P. Dept.

(57) ABSTRACT

A sensor signal processor includes a scale having optically or magnetically fine divisions; a detection sensor that moves with respect to the scale and that is provided in association with the divisions of the scale; and a position detecting unit for calculating positional information by using a counter value of digital pulse signals generated from the outputs from the detection sensor and analog signals generated from the outputs from the detection sensor. The sensor signal processor yields the positional information by using both the digital pulse signals and the analog signals.

4 Claims, 11 Drawing Sheets

RESULT OF tan$^{-1}$

SENSOR SIGNAL PROCESSOR

CROSS REFERENCE TO RELATED APPLICATIONS

This application is a continuation of U.S. patent application Ser. No. 10/968,320, now U.S. Pat. No. 7,099,790, filed Oct. 18, 2004, which claims priority from Japanese Patent Application No. 2003-361535 filed Oct. 22, 2003, both of which are hereby incorporated by reference herein in their entirety.

BACKGROUND OF THE INVENTION

1. Field of the Invention

The present invention relates to a sensor signal processor for use in measurements.

2. Description of the Related Art

Optical and magnetic encoders are now in widespread use as position detection sensors. To increase encoder resolution, conventional systems have electrically multiplied the analog sine waves that are output from the encoder, without smaller divisions of scale in the encoder.

FIG. 11 illustrates the relationship between an example of a contrast pattern of detected light and the pattern of a photodiode array in a photo receiver used in an optical encoder functioning as a position detection sensor. Photodiode arrays S1 to S4 are arranged out of phase by 0°, 90°, 180°, and 270°, respectively, with respect to the contrast pattern.

FIG. 12 is a circuit diagram of a signal processor for processing signals supplied from the photodiode arrays S1 to S4 in FIG. 11. Referring to FIG. 12, current supplied from each photodiode array S1 to S4 is respectively supplied to each current-voltage converter 300a to 300d. The signals that have been subjected to the current-voltage conversion are out of phase by 0°, 90°, 180°, and 270°, respectively, with respect to the contrast pattern. The signals from the photodiode arrays S1 and S3 are differentially amplified by a differential amplifier 301a and the signals from the photodiode arrays S2 and S4 are differentially amplified by a differential amplifier 301b to provide A-phase and B-phase analog-sine-wave voltage signals A and B that are out of phase by 0° and 90°, respectively, with respect to the contrast pattern.

FIG. 13 illustrates an example of a known resistance dividing circuit, disclosed in Swiss Patent No. 407569, capable of dividing the pitch of a primary signal into 16 sub-divisions by using two-phase analog signals. Signals $A\sin\theta$ and $A\cos\theta$ are supplied to buffer amplifiers 20A and 20B. The amplified signals are applied to nodes of resistor arrays R1–R4, along with a signal $-A\sin\theta$ given by inverting an output from the buffer amplifier 20A by using an inverting amplifier 22. A total of eight comparators 24A to 24H are provided corresponding to the nodes of the resistor array. A reference voltage Vr for comparison is supplied from a reference-voltage adjuster 26 to each of the comparators 24A to 24H. The outputs from the comparators 24A to 24H are synthesized by exclusive OR gates 28A to 28F. The synthesized signals are output from a direction discriminator 30 to which an oscillator 32 is connected.

In this resistance dividing circuit, the ratio of the values of resistors R1 to R4 of the resistor array is set to 1:0.707: 0.707:1. Since 180° are divided into eight, 360° are divided into 16.

FIG. 14 is a block diagram of an example of a multiplier circuit (optical encoder). The optical encoder has a sensor unit 41 and a signal processor 42. The sensor unit 41 includes a light emitter 51, scales 54 and 55, and a photo receiver 52. The signal supplied from the photo receiver 52 is amplified by an amplifier 64 and is subjected to arithmetic processing to provide analog signals $A\sin\theta$ and $A\cos\theta$.

The analog signals $A\sin\theta$ and $A\cos\theta$ are supplied to first and second analog-to-digital converters 61 and 62 to be converted into digital data. The output signals DA and DB converted into digital data are supplied to a read-only memory (ROM) 63. The signals from the ROM 63 are supplied to a synthesizer 66 and a synthesizer and PA/PB converter 67. Analog amplitude levels $(DA)^2$ and $(DB)^2$ corresponding to the output signals DA and DB are output from the synthesizer 66. Positional information $\tan^{-1}$ (DA/ DB) is output from the synthesizer and PA/PB converter 67. A clock generator 65 determines the timing of data sampling. The data is updated in accordance with the timing of a clock pulse.

When the resistance division is performed in the multiplier circuit in FIG. 14, increasing the number of multipliers in order to increase the resolution enlarges the circuit, thus raising the cost. The system for converting the values given by analog-to-digital conversion into positional information as a table must have a sufficient memory corresponding to the table. Accordingly, it is necessary to increase the memory space as the resolution is increased, thus also enlarging the circuit.

Further, in the multiplier circuit in FIG. 14, the sensor unit 41 outputs only the analog signals that are sampled after amplification by using a clock pulse. However, at higher moving speed at which the output from the encoder has higher frequencies, the capacity of the analog-to-digital converters 61 and 62 is insufficient, so that the number of analog waves of the signal can be incorrectly counted.

SUMMARY OF THE INVENTION

In order to resolve one or more disadvantages of conventional systems, the present invention provides a sensor signal processor capable of supplying both analog signals and digital signals from a detection sensor to provide accurate positional information by arithmetic operation.

A sensor signal processor according to the present invention includes a scale having optically or magnetically fine divisions; a detection sensor that moves with respect to the scale and that is provided in association with the divisions of the scale; and a position detecting unit for calculating positional information by using a counter value of digital pulse signals generated from the outputs from the detection sensor and analog signals generated from the outputs from the detection sensor. The sensor signal processor detects relative displacement of the scale and the detection sensor.

Both the digital signals and the analog signals are provided in the sensor signal processor according to the present invention. Accurate positional information can be provided, regardless of the speed of an object, by detecting and calculating the state of the signals to selectively use the calculation result. For example, the digital signals may be used when an object to be measured moves at a higher speed, and the analog signals may be used when the object moves at slower speeds.

Further features and advantages of the present invention will become apparent from the following description of the embodiments with reference to the attached drawings.

DETAILED DESCRIPTION OF THE EMBODIMENTS

First Embodiment

Figure 1:
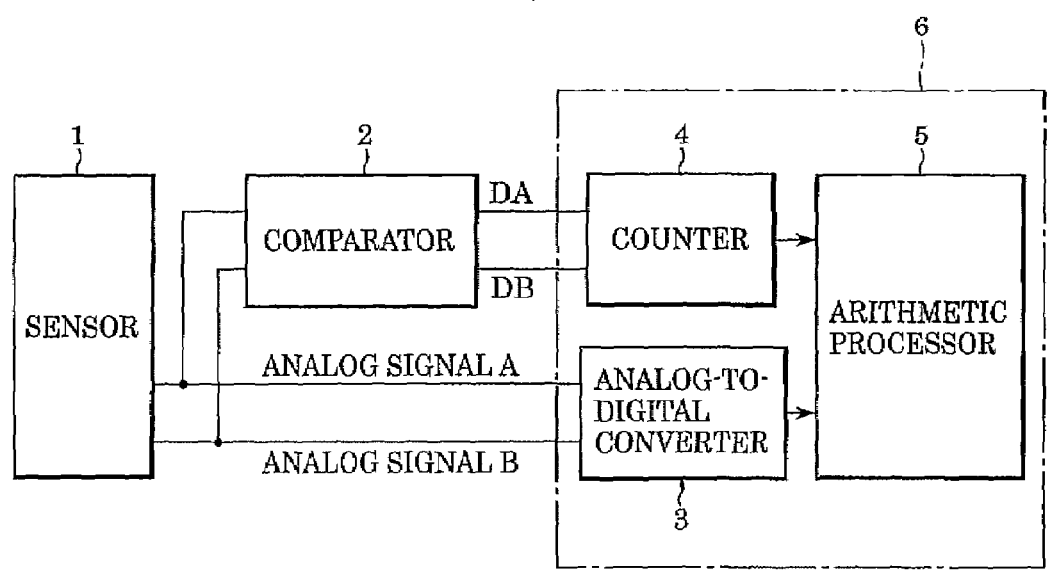
FIG. 1 is a block diagram of a signal processor according to a first embodiment of the present invention.

FIG. 1 is a block diagram of a signal processor according to a first embodiment of the present invention. A sensor 1 includes a scale (not shown), such as an encoder, which has optically or magnetically fine divisions and a detection sensor that moves with respect to the scale and that is provided in association with the divisions of the scale.

A comparator 2 for converting analog signals A and B output from the sensor 1 into digital signals and an analog-to-digital converter 3 are connected in parallel to the sensor 1.

The outputs from the comparator 2 are supplied to an arithmetic processor 5, such as a central processing unit (CPU), through a counter 4 along with the outputs from the analog-to-digital converter 3. The analog-to-digital converter 3, the counter 4, and the arithmetic processor 5 are included in a microcomputer 6.

The signal processor of the first embodiment is structured such that both the digital signals and the analog signals are supplied from the sensor 1 and such that the digital signals are counted by the counter 4. With this structure, the sensor 1 can detect a distance by using a value counted by the counter 4 even if the analog-to-digital converter 3 does malfunction.

Figure 2:
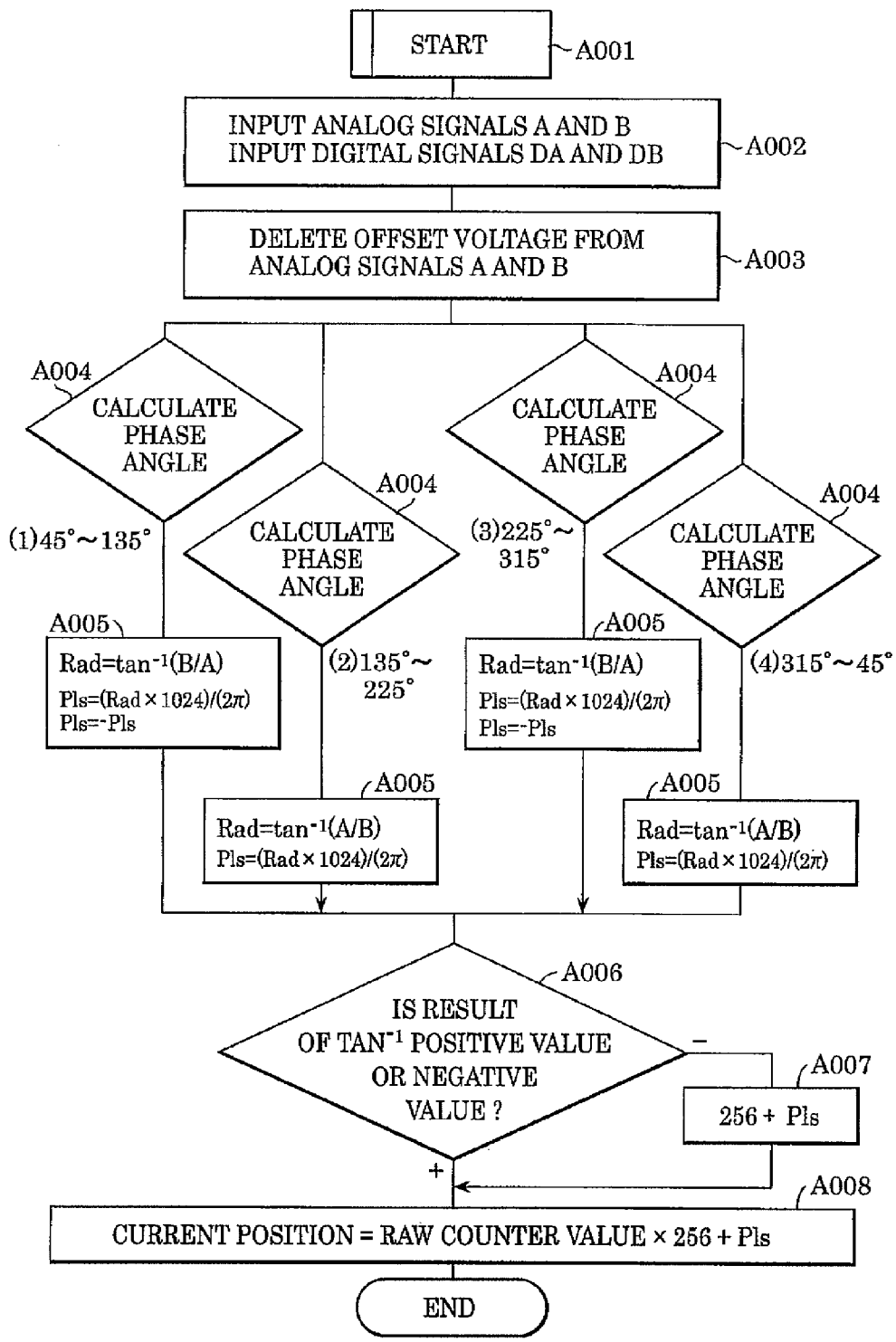
FIG. 2 is a flowchart showing arithmetic processing in an arithmetic processor shown in FIG. 1.
Figure 3:
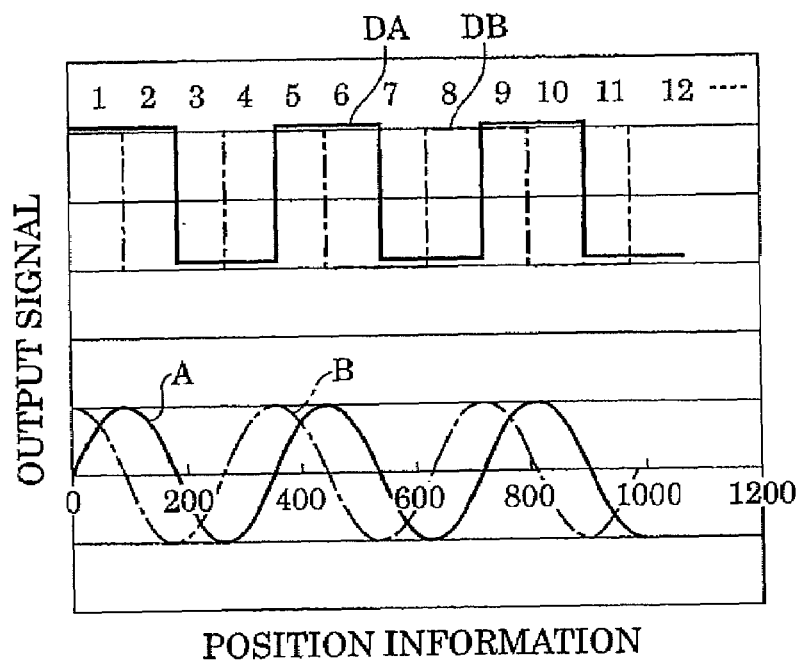
FIG. 3 is a graph showing signals supplied to the arithmetic processor shown in FIG. 1.
Figure 4:
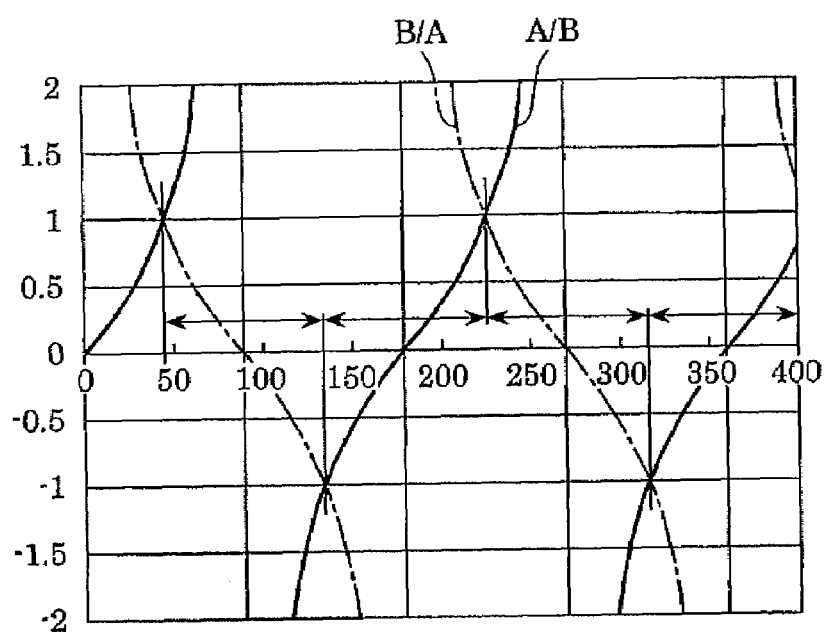
FIG. 4 is a graph showing division results between A-phase and B-phase analog signals, in which one wave shown in FIG. 3 is enlarged.
Figure 5:
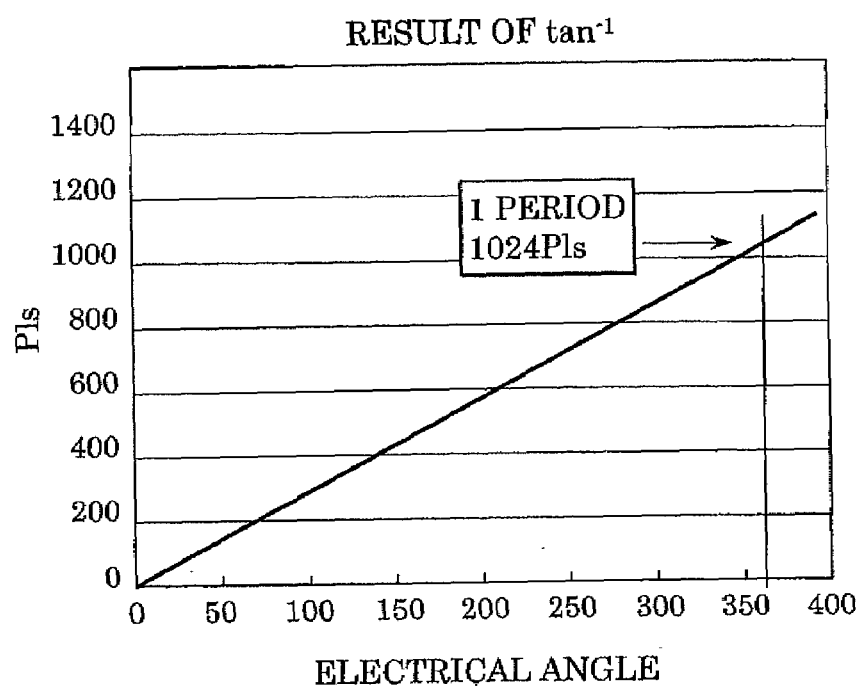
FIG. 5 is a graph showing the results of a $\tan^{-1}$ calculation for the A-phase and B-phase analog signals shown in FIGS. 3 and 4.

FIG. 2 is a flowchart showing arithmetic processing in the arithmetic processor 5 according to an embodiment of the present invention. FIGS. 3 to 5 show waveforms generated during the arithmetic processing shown in FIG. 2. The first embodiment will now be described with reference to FIGS. 2 to 5.

Referring to FIG. 3, the input signals supplied to the arithmetic processor 5 are digital signals DA and DB and analog signals A and B, which are positional information signals. The digital signals DA and DB are generated in the comparator 2 based on the analog signals A and B. The digital signals DA and DB that are higher than a center voltage are considered to be in a high level, while the digital signals DA and DB below the center voltage are considered to be in a low level.

Since there is usually no need to detect accurate positions either when a device is started up or when an object to be measured is moving at high speed, the digital signals DA and DB are counted for operation. The counter 4 provides counter values given by quad multiply of the digital signals DA and DB.

In a mode that requires more accurate positions, in Step A001 in the flowchart in FIG. 2, the microcomputer 6 is activated. In Step A002, the digital signals DA and DB are supplied to the counter 4 and the analog signals A and B are supplied to the analog-to-digital converter 3. In Step A003, an offset voltage is deleted from the analog signals A and B.

In Step A004, the position of the object is determined by calculation based on the following relationship between A-phase and B-phase signals, in which the analog signals are represented by electrical angles from 0° to 360°:

$$A \geq |B|: 45° \text{ to } 135° \tag{1}$$

$$B \leq |A|: 135° \text{ to } 225° \tag{2}$$

$$A \leq |B|: 225° \text{ to } 315° \tag{3}$$

$$B \geq |A|: 315° \text{ to } 45° \tag{4}$$

In Step A005, after the arithmetic processor 5 determines a region to which the position belongs based on the relationships (1) to (4) between the A-phase and B-phase signals, division between the A-phase and B-phase signals is performed.

FIG. 4 is a graph showing results of division of A-phase and B-phase signals, in which one wave shown in FIG. 3 is enlarged. The arithmetic processor 5 determines whether the denominator is phase A or phase B based on the relationship between the A-phase and B-phase signals. In order to avoid generating a value close to infinity if the denominator is a small value, the denominator is switched between phase A and phase B to provide a division result of one or less. Since the division result has negative gradient within a range from 45° to 135° and a range from 225° to 315°, the sign is actually reversed.

The $\tan^{-1}$ calculation in Step A005 produces values in proportion to the electrical angle, as shown in FIG. 5. Allocating the values to numbers given by dividing one period provides counter values corresponding to the resolution.

Referring to FIG. 5, one period is equally divided into 1,024 pulses. The counter 4 counts 1,024 times during one period. In Step A006 in FIG. 2, the arithmetic processor 5 determines whether the $\tan^{-1}$ calculation produces a positive value or a negative value. Since a row counter value belongs to a smaller region if the $\tan^{-1}$ calculation produces a negative value, in Step A007, the arithmetic processor 5 adds 256 pulses, which correspond to a quarter of one period. When the sine wave of one period is divided into 1,024 pulses, a value given by calculating and digitizing a position within the sine wave is represented as Pls. For example, when Rad is positioned at 180°, Pls=512 because Rad=$\pi$. When Rad is positioned at 90°, Pls=1024/4=256.

Accordingly, in Step A008, a positional counter value is given by [row counter value]×256+Pls.

Second Embodiment

Figure 6:
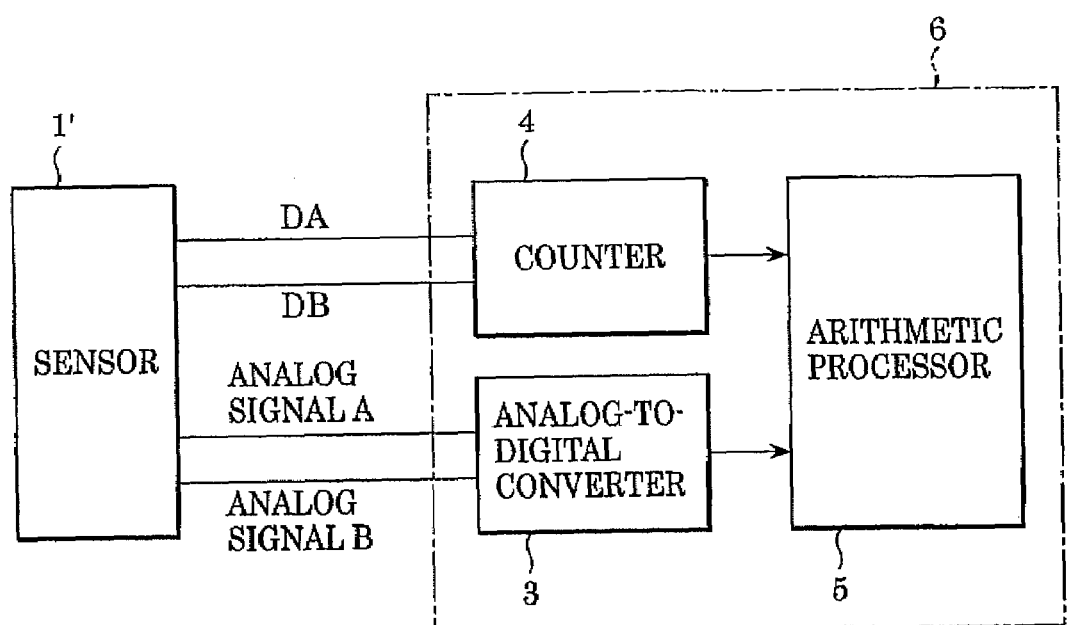
FIG. 6 is a block diagram of a signal processor according to a second embodiment of the present invention.
Figure 7:
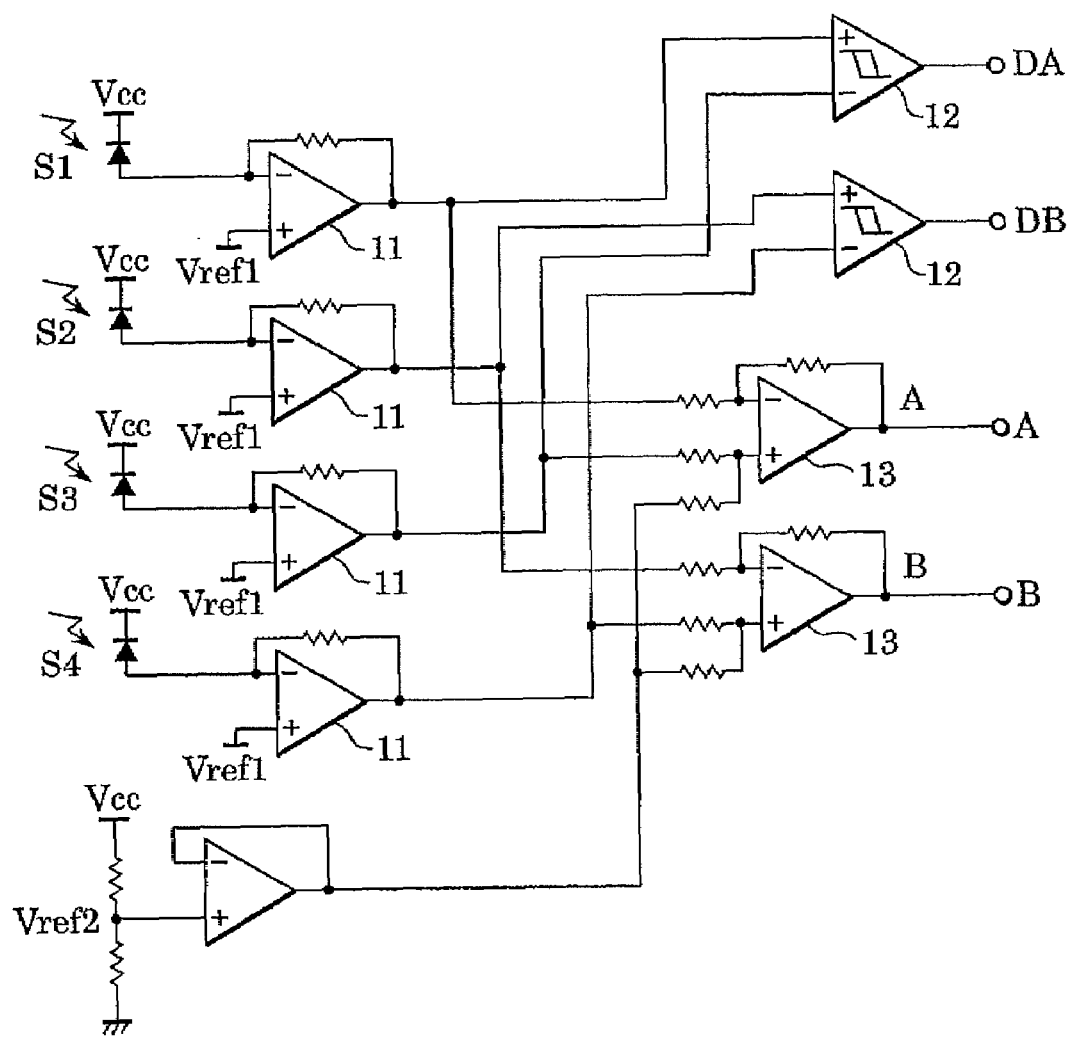
FIG. 7 shows a circuit configuration of a sensor head that outputs digital signals and analog signals according to an embodiment of the present invention.
Figure 8:
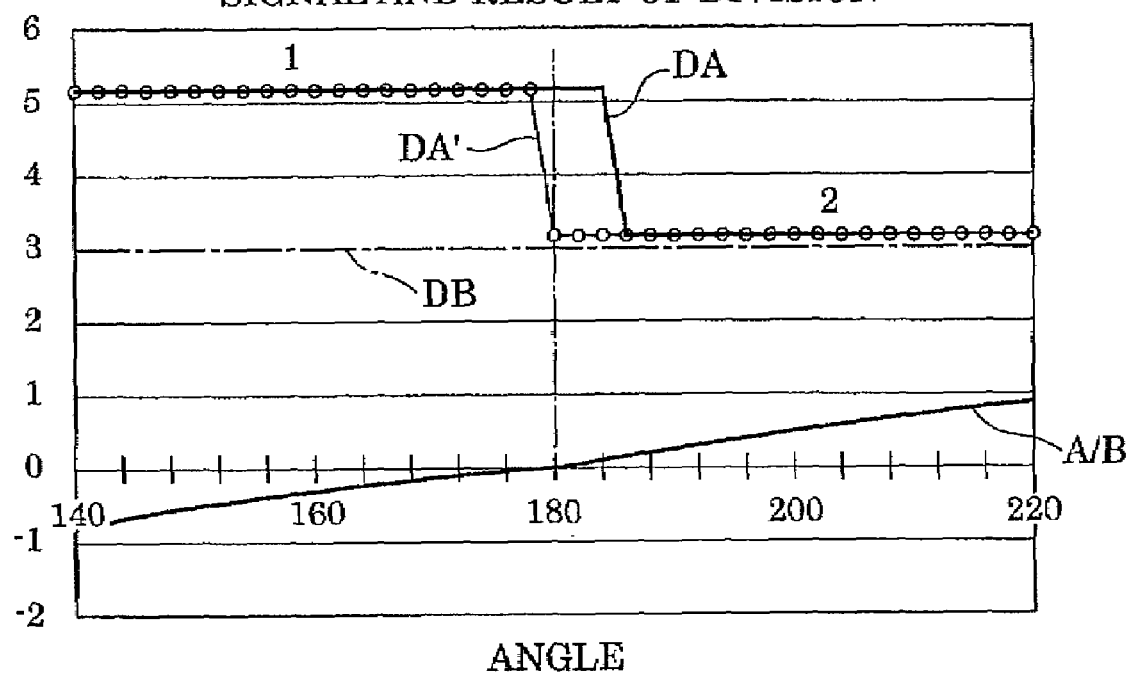
FIG. 8 is a graph showing waveforms processed in an arithmetic processor.

FIG. 6 is a block diagram of a signal processor according to a second embodiment of the present invention. The comparator 2 shown in FIG. 1 is included in a sensor 1'. FIG. 7 shows a circuit configuration of a sensor head that outputs digital signals and analog signals. FIG. 8 is a graph showing the timing of switching of the region of digital signals and part of the division result of analog signals for the signal processor in FIG. 6. An advantage of the present invention is that performance of the signal processor is improved by outputting the digital signals DA and DB from the sensor 1'.

When, as in the first embodiment, the analog signals A and B supplied from the sensor 1 are binarized to yield the digital signals DA and DB, the timing of pulse switching is delayed from a time when the analog signal A or B crosses zero because the comparator 2 performing the binarization has hysteresis, as shown in FIG. 8. Accordingly, part of the pulse is not switched even though the analog signals A and B have crossed zero and the counter value of the calculation result is shifted by 256, thus producing a large error.

To address such a disadvantage, the digital signals are output from the sensor 1' as shown in FIG. 6 to prevent the delay. Referring to FIG. 7, photodiode arrays S1 to S4 are shown. A current-to-voltage converter 11 is provided downstream of each of the photodiode of the photodiode array S1 to S4. Signals that are out of phase with each other by 90° are output from the photodiode arrays. Specifically, signals that are out of phase with each other by 180° and that are supplied from the photodiode arrays S1 and S3 are supplied to the positive and negative ports of a comparator 12, and signals that are out of phase with each other by 180° and that are supplied from the photodiode arrays S2 and S4 are supplied to the positive and negative ports of another comparator 12. The supplied signals are binarized to produce the digital signals DA and DB.

With such a structure, since downstream differential amplifiers 13 are not affected by a DC offset and the input ports of the comparators 12 have a push-pull arrangement, digital signals DA and DB that are not delayed from the analog signals A and B are produced, thus causing no error in the calculation result, as shown by a signal DA' in FIG. 8.

Third Embodiment

Figure 9:
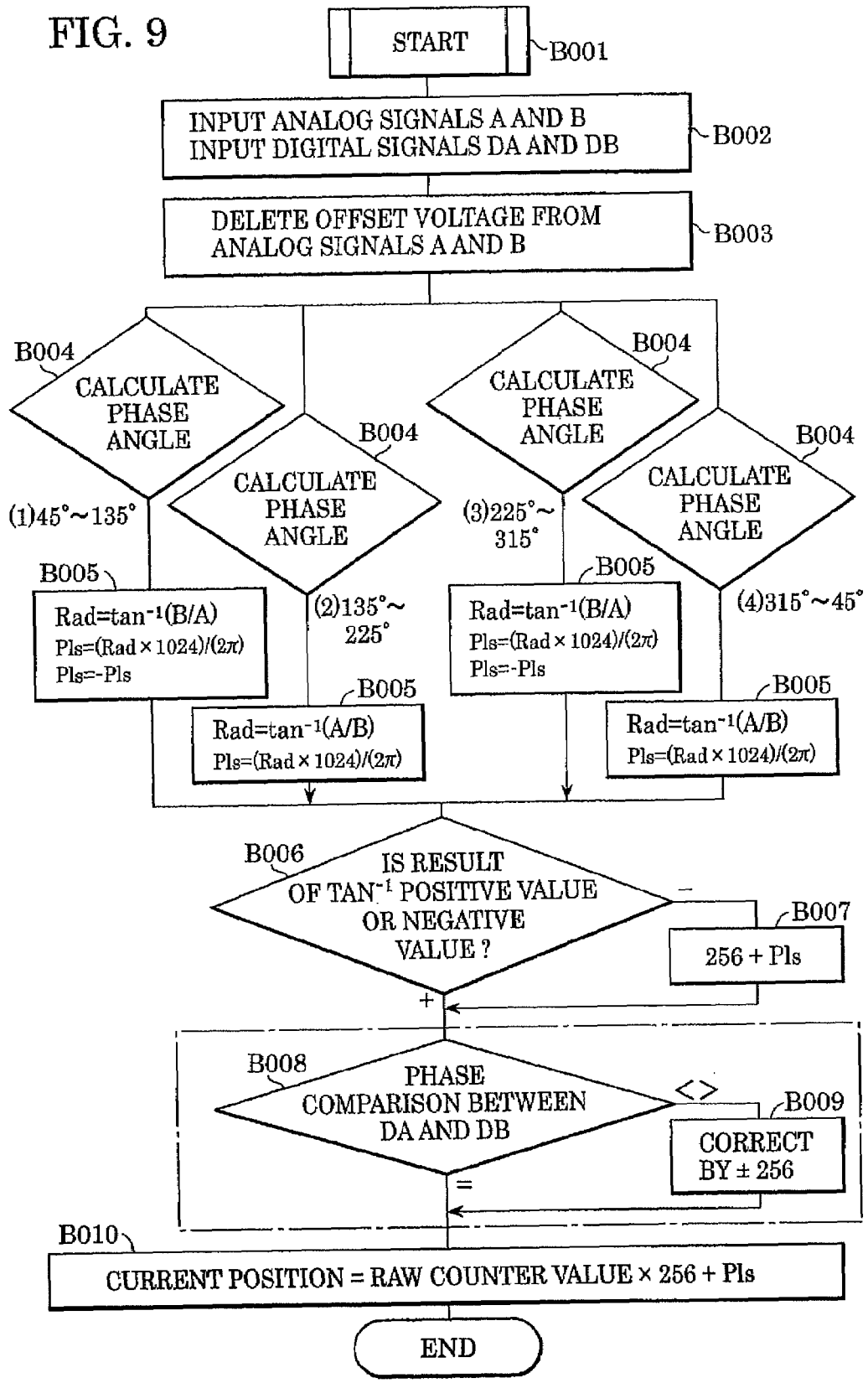
FIG. 9 is a flowchart showing arithmetic processing in an arithmetic processor according to a third embodiment of the present invention.
Figure 10:
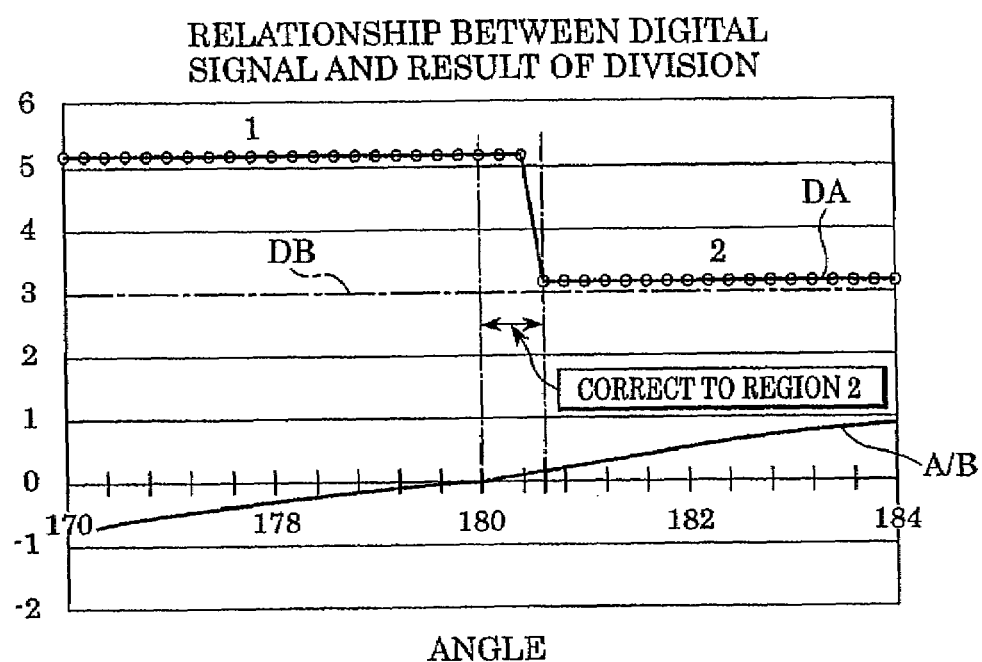
FIG. 10 is a graph showing waveforms processed in the arithmetic processor of FIG. 9.
Figure 11:
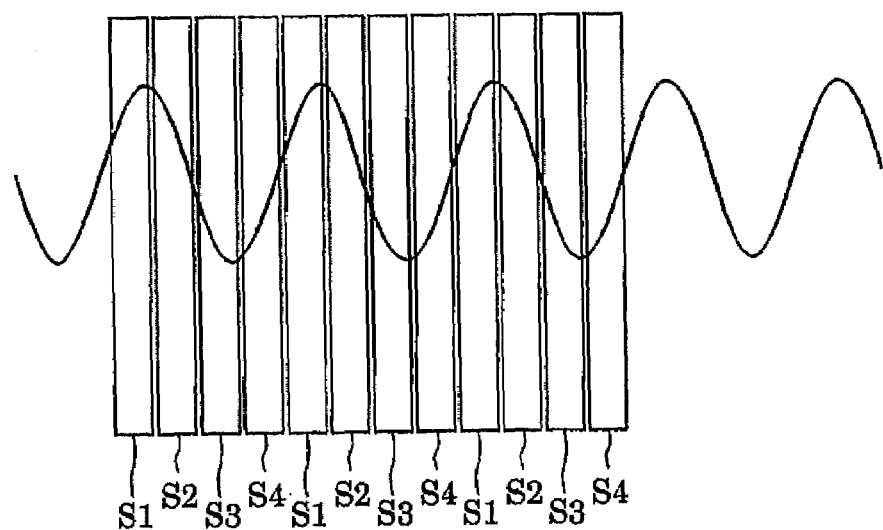
FIG. 11 illustrates the relationship between an example of the pattern of a photodiode array and a contrast pattern of detected light.
Figure 12:
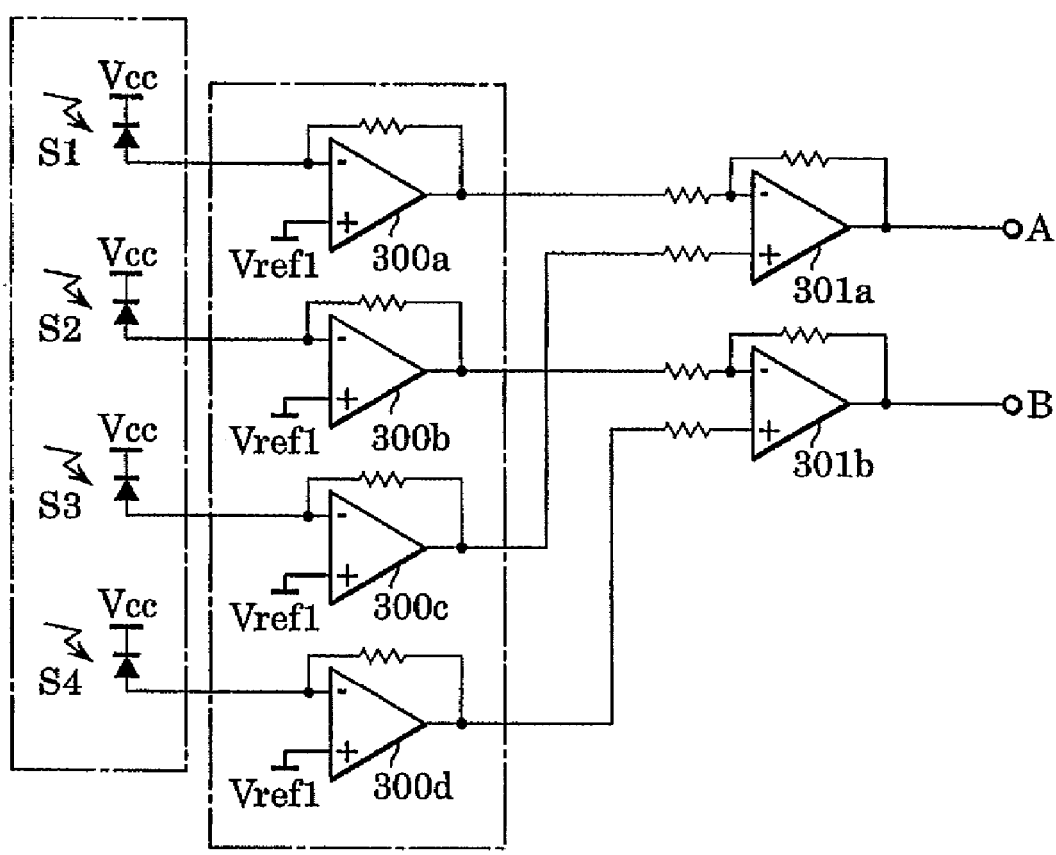
FIG. 12 is a circuit diagram of a signal processor for processing signals supplied from photodiode arrays shown in FIG. 11.
Figure 13:
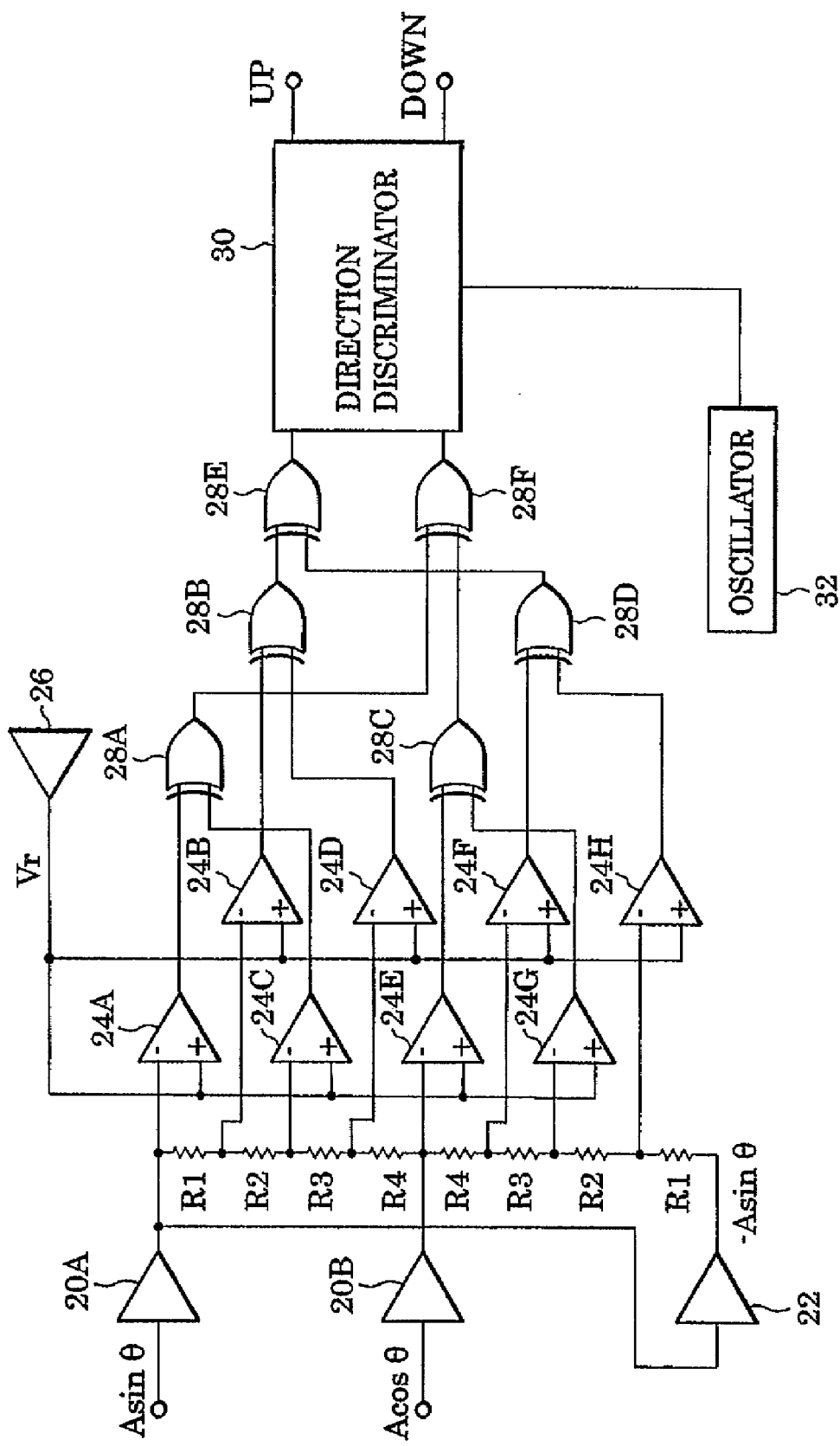
FIG. 13 illustrates an example of a conventional resistance dividing circuit.
Figure 14:
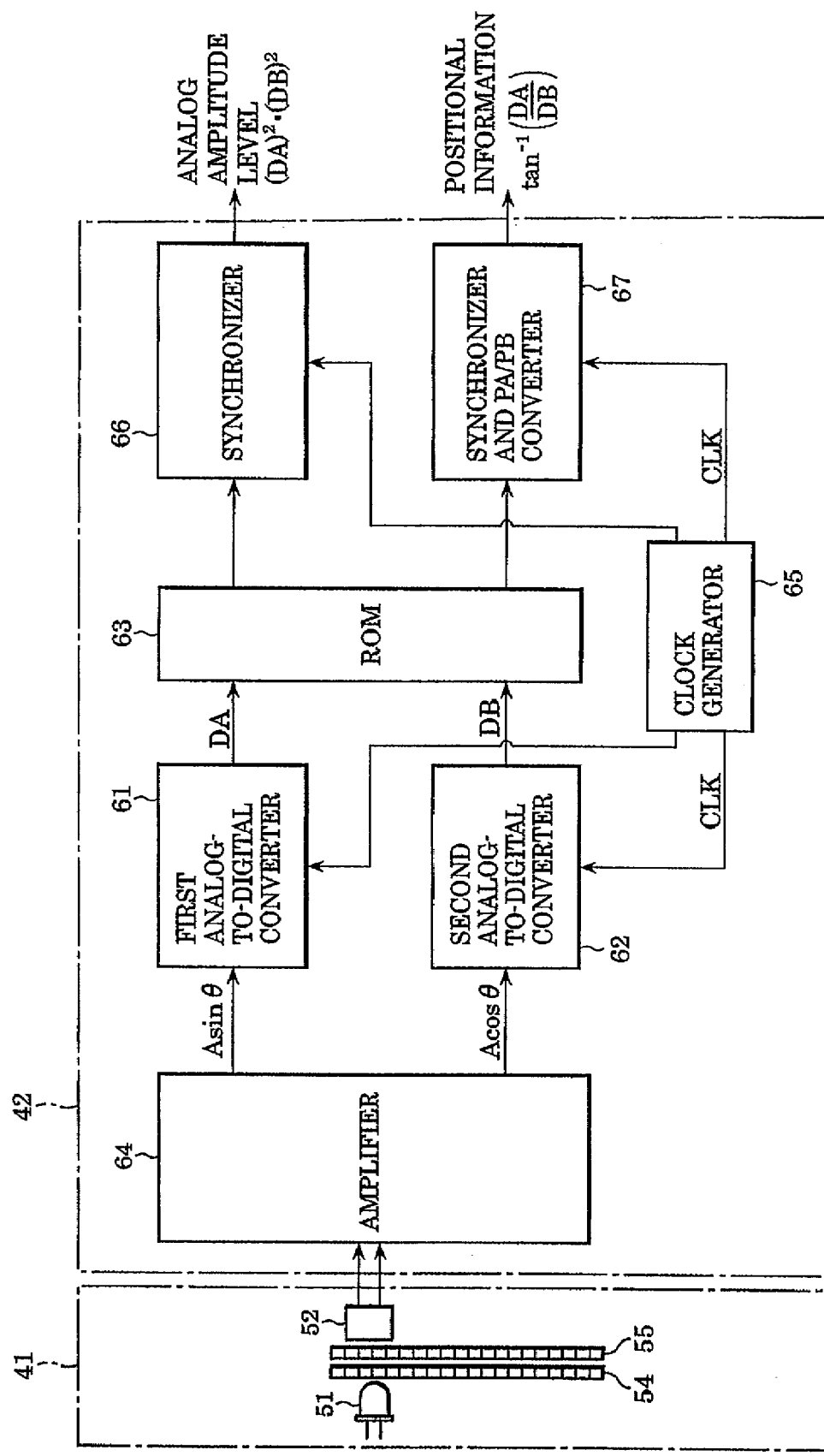
FIG. 14 is a block diagram of an example of a multiplier circuit (optical encoder).

FIG. 9 is a flowchart showing arithmetic processing in an arithmetic processor according to a third embodiment of the present invention. Steps from B001 to B007 are similar to Steps A001 to A007 in FIG. 2. FIG. 10 is a graph showing the timing of switching of the region of digital signals DA and DB and part of the division result of analog signals A and B according to the third embodiment.

As shown in FIG. 10, the hysteresis of the comparator 2 does not become zero. Hence, when the positions are detected with higher resolution, that is, at a pitch of 0.2°, the switching position of the digital signals DA and DB is shifted from a point where the analog signal A or B crosses zero.

When regions 0 to 3 are arranged in ascending order of electrical angles given by quad multiply of one period of the digital signal, as shown in FIG. 3, the switching point from the region 1 to the region 2 is shown in FIG. 10.

For example, when the switching point is reset to the region 0 by using a home position signal or the like at a position that is not in the vicinity of the switching point of the digital signals DA and DB, among positions having an electrical angle of 0° to 90° between the analog signals A and B, the following results are attained:

(1) 45° to 135°: Pls<0→region 0 (raw counter value=4×n), Pls>0→region 1 (raw counter value=4×n+1);
(2) 135° to 225°: Pls<0→region 1 (raw counter value=4×n+1), Pls>0→region 2 (raw counter value=4×n+2);
(3) 225° to 315°: Pls<0→region 2 (raw counter value=4×n+2), Pls>0→region 3 (raw counter value=4×n+3); and
(4) 315° to 45°: Pls<0→region 3 (raw counter value=4×n+3), Pls>0→region 0 (raw counter value=4×n).

In Step B008, the arithmetic processor compares the phase of digital signals DA and DB. If there is no consistency between the sign of Pls and a raw counter value based on this relationship, the arithmetic processor determines that the an error, as noted above, has occurred and, in Step B009, the arithmetic processor corrects the raw counter value. In Step B010, a positional counter value is given by [row counter value]×256+Pls.

As shown in the flowchart in FIG. 9, when the relationship between the digital pulse signals and the analog signals is inconsistent, correcting the counter value of positional detection provides accurate positional information even when the signal processor is used at higher resolution.

While the present invention has been described with reference to what are presently considered to be the embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A sensor signal processor comprising:
a scale having at least one of optically and magnetically fine divisions;
a detection sensor unit configured to move relatively with respect to the scale and disposed in association with the at least one of the optically and magnetically fine divisions of the scale, the detection sensor unit being configured to output analog signals and digital pulse signals generated from the analog signals;
a counter that counts the digital pulse signals;
a signal processing unit that A/D coverts the analog signals to obtain a division finer than that obtained by the counter; and
a position detecting unit detecting a relative displacement between the scale and the detection sensor,
wherein the relative displacement information between the scale and the detection sensor is obtained by calculating the counter value of the counter and the A/D converted analog signals.

2. The sensor signal processor according to claim 1, wherein the analog signals include a first analog signal and a second analog signal, which are out of phase and on which the relative displacement is based.

3. The sensor signal processor according to claim 2, wherein the calculation is changed in accordance with the relationship between the first and second analog signals.

4. The sensor signal processor according to claim 2, wherein the relative displacement is calculated by performing division and $\tan^{-1}$ operations using the first and second analog signals.

* * * * *